United States Patent
Herrero

(10) Patent No.: US 10,148,615 B2
(45) Date of Patent: Dec. 4, 2018

(54) CLIENT SIDE TELECOMMUNICATIONS TUNNEL PERSISTENCE

(71) Applicant: Oracle International Corporation, Redwood Shores, CA (US)

(72) Inventor: Rolando Herrero, Derry, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 72 days.

(21) Appl. No.: 15/298,797

(22) Filed: Oct. 20, 2016

(65) Prior Publication Data

US 2018/0115515 A1    Apr. 26, 2018

(51) Int. Cl.
  *H04L 29/06*  (2006.01)
  *H04L 29/12*  (2006.01)
  *H04W 88/02*  (2009.01)

(52) U.S. Cl.
  CPC .......... *H04L 61/2592* (2013.01); *H04L 69/28* (2013.01); *H04L 61/256* (2013.01); *H04W 88/02* (2013.01)

(58) Field of Classification Search
  CPC ..... H04L 61/2592; H04L 69/28; H04W 88/02
  See application file for complete search history.

(56) References Cited

U.S. PATENT DOCUMENTS

| | | | | |
|---|---|---|---|---|
| 6,215,782 B1* | 4/2001 | Buskens | ............... | H04W 76/02 370/350 |
| 7,151,780 B1* | 12/2006 | Belscher | ............ | G06Q 20/1085 370/466 |
| 9,608,962 B1* | 3/2017 | Chang | ................. | H04L 63/0272 |
| 2005/0044240 A1* | 2/2005 | DePree | ................... | H04L 29/06 709/228 |
| 2006/0236388 A1* | 10/2006 | Ying | ................... | H04L 12/4641 726/15 |
| 2008/0077788 A1* | 3/2008 | Jain | ....................... | H04L 63/029 713/151 |
| 2008/0120418 A1* | 5/2008 | DePree | ................... | H04L 29/06 709/227 |

(Continued)

OTHER PUBLICATIONS

H. Schulzrinne et al.; "RTP: A Transport Protocol for Real-Time Applications";Jul. 2003; 89 pages.

(Continued)

*Primary Examiner* — Kashif Siddiqui
(74) *Attorney, Agent, or Firm* — Potomac Law Group, PLLC

(57) ABSTRACT

A client or user equipment ("UE") that initiates a plurality of calls using encapsulated media, in response to a first tunnel creation request, from an application associated with a first call, initiates the first call by creating a first tunnel between the client and a server. The UE transmits the encapsulated media associated with the first call over the first tunnel. The UE, in response to a tunnel termination request, from the application, associated with a termination of the first call, waits for an expiration of a predefined persistence period. The UE, in response to a second tunnel creation request, from the application associated with a second call, before the expiration of the predefined persistence period, initiates the second call using the first tunnel. The UE then transmits the encapsulated media associated with the second call over the first tunnel.

20 Claims, 6 Drawing Sheets

(56) References Cited

U.S. PATENT DOCUMENTS

| | | |
|---|---|---|
| 2009/0217358 A1* | 8/2009 | Kumar ................ H04L 63/0272 |
| | | 726/5 |
| 2011/0238801 A1* | 9/2011 | Bahl ................. H04L 29/12066 |
| | | 709/221 |
| 2013/0283037 A1 | 10/2013 | Katz et al. |
| 2014/0379931 A1 | 12/2014 | Gaviria |
| 2015/0039687 A1 | 2/2015 | Waxman et al. |
| 2016/0112372 A1* | 4/2016 | Katz .................... H04L 63/029 |
| | | 726/15 |
| 2016/0191380 A1* | 6/2016 | De .......................... H04L 45/74 |
| | | 370/338 |
| 2017/0078359 A1* | 3/2017 | Herrero ................ H04L 65/608 |

OTHER PUBLICATIONS

3rd Generation Partnership Project; Technical Specification Group Services and System Aspects; Study on firewall traversal (Stage 2) (Release 12); 3GPP TR 33.830 V0. 5.0 (Nov. 2013).

F. Wang et al.; "CloudJet4BigData: Streamlining Big Data via an accelerated socket interface"; the IEEE 3rd International Congress on big data (BigData 2014); Alaska; USA; Jun. 27-Jul. 2, 2014.

C. Mattmann et al.; "A Classification and Evaluation of Data Movement Technologies for the Delivery of Highly Voluminous Scientific Data Products"; Jet Propulsion Laboratory; California Institute of Technology; May 25, 2006.

* cited by examiner

US 10,148,615 B2

CLIENT SIDE TELECOMMUNICATIONS TUNNEL PERSISTENCE

FIELD

One embodiment is directed generally to a communications network, and in particular, to the transmission of encapsulated media within a tunnel over a communications network.

BACKGROUND INFORMATION

Many enterprise environments have replaced their Public Switched Telephone Network ("PSTN") telephony services with telephony services that use the Internet Protocol ("IP"), commonly known as Voice over IP ("VoIP") or IP Telephony. Since IP Telephony uses an IP network as its backbone, it can provide advanced features such as video conferencing, call recording, and call forwarding.

Recently, the growing base of mobile data subscribers, the wide availability of Internet access, and the high availability of bandwidth in both fixed and mobile networks has resulted in the popularity of advanced services accessed via the Internet (known as Over-the-Top ("OTT") services). This has caused competitive service providers to offer OTT services and hence face corresponding challenges as they implement these new services.

SUMMARY

One embodiment is a client or user equipment ("UE") that initiates a plurality of calls using encapsulated media. The UE, in response to a first tunnel creation request, from an application associated with a first call, initiates the first call by creating a first tunnel between the client and a server. The UE transmits the encapsulated media associated with the first call over the first tunnel. The UE, in response to a tunnel termination request, from the application, associated with a termination of the first call, waits for an expiration of a predefined persistence period. The UE, in response to a second tunnel creation request, from the application associated with a second call, before the expiration of the predefined persistence period, initiates the second call using the first tunnel. The UE then transmits the encapsulated media associated with the second call over the first tunnel.

DETAILED DESCRIPTION

One embodiment creates tunnels for outgoing telephone calls that use encapsulated media and are placed by a client device. When outgoing calls are placed by the client device back to back, or within a short time duration of each other, embodiments delay any tunnel termination between calls in order to preserve server resources.

Figure 1:
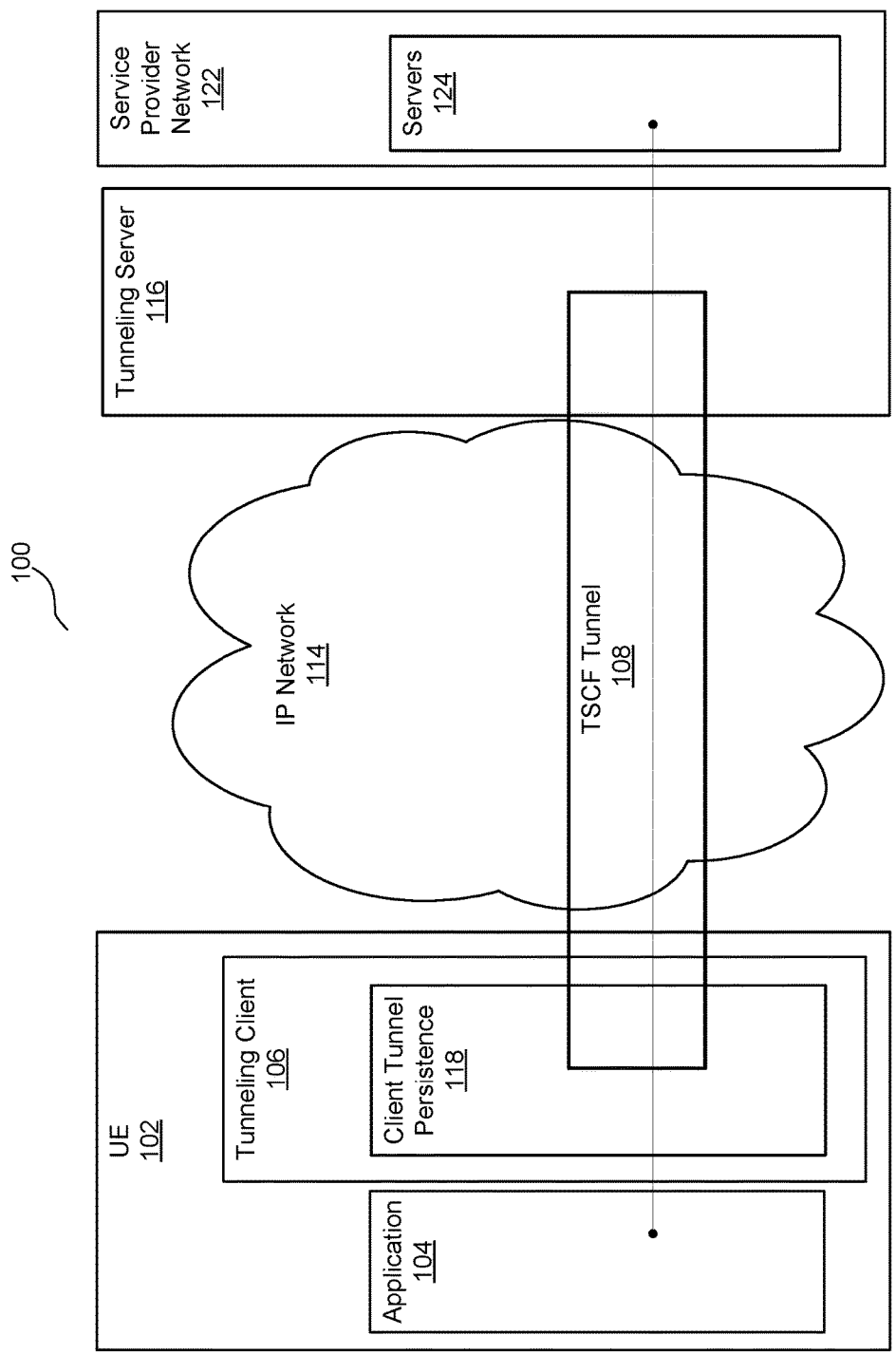
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that performs real-time communications ("RTC") over an Internet Protocol ("IP") network 114 with a service provider network/backbone 122. In RTC, users exchange information instantly or with insignificant latency. Example applications for RTC include voice and/or video calls, application streaming, softphones, and remote desktop applications. UE 102 may be any device used by an end-user for communications, such as a smartphone, a laptop computer, a tablet, a television, etc.

In performing RTC, UE 102 communicates signaling and media traffic with servers 124 of service provider network 122. Signaling traffic may be communicated according to an application layer protocol such as the Session Initiation Protocol ("SIP"). SIP is configured to be independent of the underlying transport layer. Accordingly, SIP can run on different transport protocols, such as the Transmission Control Protocol ("TCP" as described in, for example, Internet Engineering Task Force ("IETF") request for comments ("RFC") 793 and RFC 675), the User Datagram Protocol ("UDP" as described in, for example, IETF RFC 768), etc.

Network 100 further includes a tunneling server 116 that, together with a tunneling client 106 within UE 102, provides functionality for establishing and managing one or more tunnels for performing RTC according to the Tunneled Services Control Function ("TSCF") standard as described in, for example, 3rd generation partnership program ("3GPP") technical report ("TR") 33.830 V0.5.0, the disclosure of which is hereby incorporated by reference in its entirety. In one embodiment, tunneling client 106 and tunneling server 116 establish a TSCF tunnel 108, in response to the initiation of a call from UE 102, that is compliant with TSCF tunnel management (e.g., tunnel initialization, maintenance, termination, etc., as defined by, e.g., 3GPP TR 33.830 V0.5.0), and TSCF tunnel transport protocols are supported for the negotiation of TSCF tunnel 108 between tunneling client 106 and tunneling server 116.

The TSCF standard provides client side and server side network elements for establishing managed tunnels for performing RTC (e.g., tunneling client 106 and tunneling server 116 in FIG. 1). It also provides two types of outer layer tunneling transports: a stream-based outer layer tunneling transport via TCP or Transport Layer Security ("TLS"), and a datagram-based outer layer tunneling transport via UDP or Datagram Transport Layer Security ("DTLS").

TLS is a cryptographic protocol as provided in, for example, IETF RFC 2246, RFC 4346, RFC 5246, and/or RFC 6176. DTLS is a protocol that provides communications privacy for datagram protocols. TCP and TLS provide reliable, ordered and error-checked delivery of the inner layer traffic, but introduce undesirable latency that is detrimental to RTC applications over a communication network that experiences impairments. On the other hand, UDP and DTLS do not guarantee reliable delivery, thus minimizing latency and being desirable for RTC.

In some embodiments, IP network 114 may be a restrictive network in that it may include security devices (e.g., firewalls, proxies, etc.) that allow traffic of only a certain transport protocol (e.g., only TCP, only UDP, etc.). Accordingly, tunneling client 106 and tunneling server 116 may establish and manage TSCF tunnel 108 such that UE 102 may use tunnel 108 to traverse such security devices and connect to tunneling server 116 to reach servers 124 in service provider network 122.

The TSCF standard further provides control messages for exchanging configuration information between tunneling client 106 and tunneling server 116. According to the TSCF standard, control messages are of a "request/response" type, and a control message response for a request includes either a corresponding reply or an error code indicating why the request cannot be honored by the receiving end. TSCF control messages use a Type Length Value ("TLV") encoding. TLV is a variable length concatenation of a unique type and a corresponding value.

Each TSCF control message includes a control message ("CM") header at the beginning, including a "CM_Version" field identifying the version of the header and indicating the outer transport protocol of a TSCF tunnel, a "CM_Indication" field identifying whether the message is a control message or not, a "Reserved" field reserved for future use, a "CM_Type" field identifying the type of the control message (e.g., whether it is a request or a response, the corresponding functionality, etc.), a "TLV_Count" field indicating the number of TLVs that follow or are appended to the header in the corresponding control message, a "Tunnel Session ID" ("TSID") field including a tunnel session identifier ("ID") or ("TID") assigned by tunneling server 116 to uniquely identify TSCF tunnel 108, and a "Sequence" field that is incremented per message, as described in, for example, 3GPP TR 33.830 V0.5.0.

In one embodiment, in order to establish TSCF tunnel 108, tunneling client 106 sends a "configuration request" message to tunneling server 116 to obtain configuration information for TSCF tunnel 108. In a "configuration request" message, the TSID header field bits are set to 1 (i.e., FFFF . . . ). In response, tunneling server 116 assigns a TSID to a TSCF tunnel and sends a "configuration response" message back to tunneling client 106. The "configuration response" message includes the TSID assigned by tunneling server 116 to TSCF tunnel 108. The subsequent messages between tunneling client 106 and tunneling server 116 include this assigned TSID in their headers.

In one embodiment, if a control message is communicated between tunneling client 106 and tunneling server 116 and does not include the expected TSID, the control message is dropped and the corresponding TSCF tunnel is terminated. Alternatively, in one embodiment, tunneling client 106 may send a "configuration release request" message to tunneling server 116 to terminate a TSCF tunnel. In response to such a "configuration release request" message, tunneling server 116 sends a "configuration release response" message to tunneling client 106. At this time, TSCF tunnel 108 is terminated.

In one embodiment, UE 102 executes an application 104 that may be a SIP based RTC application relying on a library such as the software development kit ("SDK") provided by the Tunneled Session Management ("TSM") solution from Oracle Corp. The TSM solution employs a client/server architecture using session border controllers ("SBCs") and client applications, such as application 104, that may be developed using the SDK. The client applications initiate secure communications sessions with the service provider over the Internet. The session border controllers (e.g., implemented by tunneling server 116) at the edge of the network terminate and control the tunnels before passing the secure traffic into the service core of service provider network 122. In one embodiment, SDKs are implemented by a client tunnel persistence module 118.

The SDKs in general provide additional APIs beyond "standard" TSCF APIs in order to implement the functionality disclosed herein. One embodiment provides TSCF SDKs that support an application programming interface ("API") so that application 104 can enable the client tunnel persistence functionality. The TSCF SDK provides a Berkeley software distribution ("BSD")-like socket API that can be used to send and receive encapsulated media using the tsc_sendto and tsc_recvfrom functions, respectively.

Figure 2:
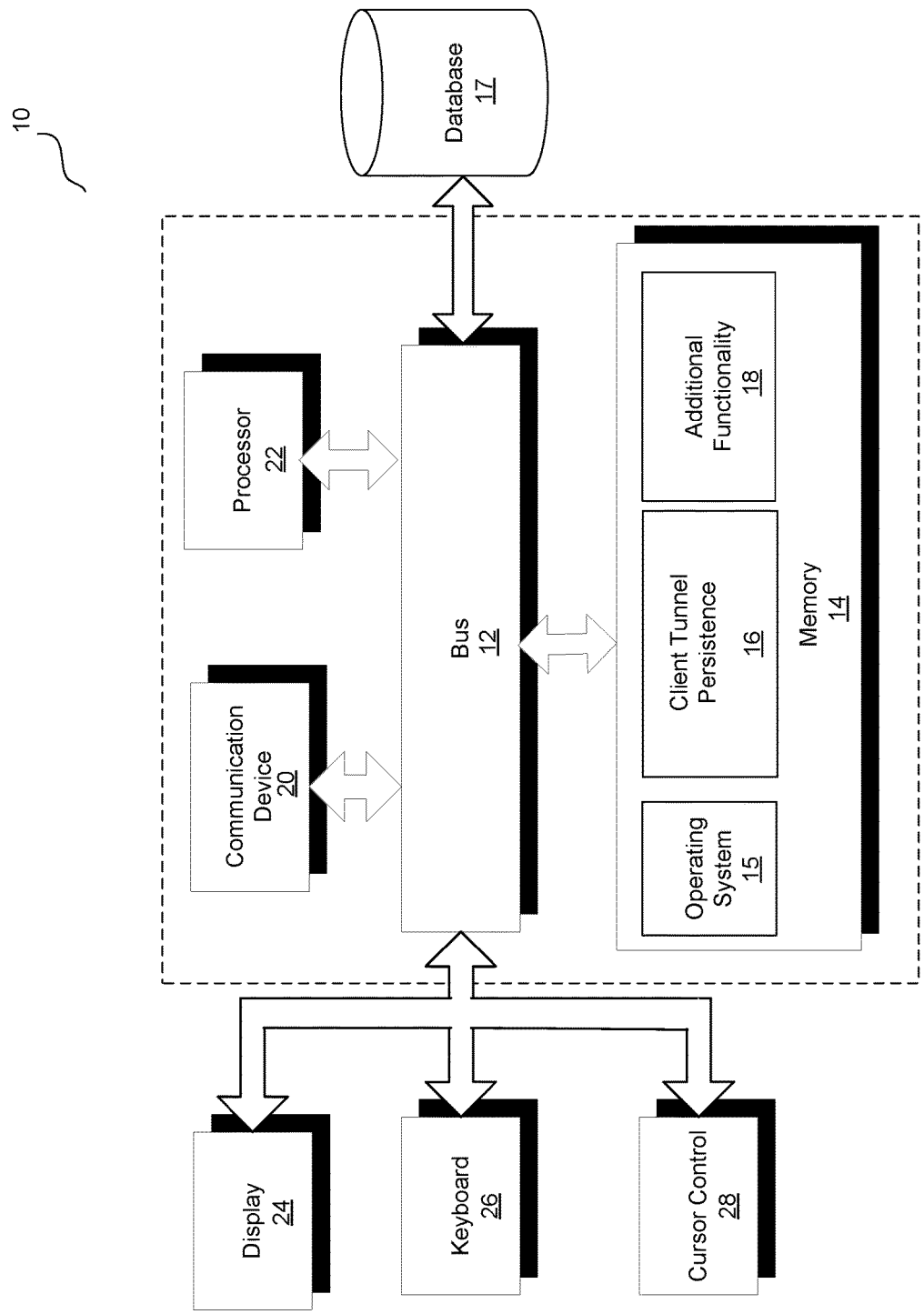
FIG. 2 is a block diagram of a computer server/system in accordance with an embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of tunneling server 116 of FIG. 1, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a client tunnel persistence module 16 for providing tunnel persistence between client calls, and all other functionality disclosed herein. In one example embodiment, client tunnel persistence module 16 may implement tunneling client 106 in conjunction with one or more remaining elements of FIG. 2. System 10 can be part of a larger system, such as added functionality to a TSCF compatible mobile phone. Therefore, system 10 can include one or more additional functional modules 18 to include the additional functionality. A database 17 is coupled to bus 12 to provide centralized storage for client tunnel persistence module 16 and additional functional modules 18.

Figure 3:
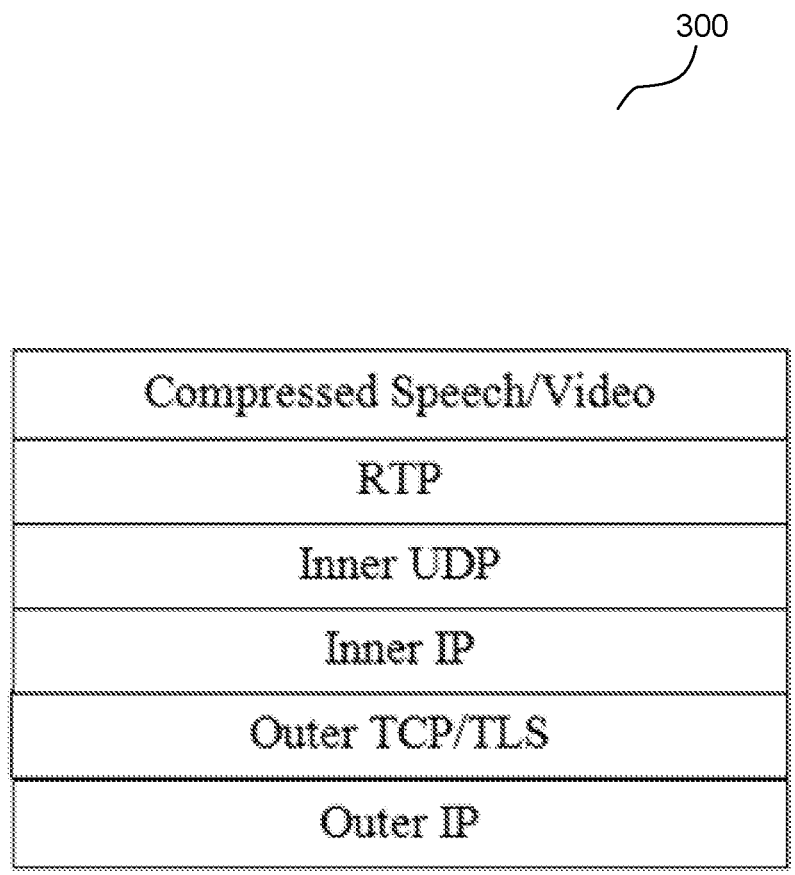
FIG. 3 illustrates example protocol layers in a Tunneled Services Control Function tunneling configuration for encapsulating media traffic according to an embodiment.

In a tunneling configuration, encapsulated (i.e., in a packet/frame) media is typically communicated according to the real-time transport protocol ("RTP" as provided, for example, in IETF RFC 3550). In a TSCF tunneling configuration, RTC (e.g., speech, video, etc.) may be subject to two levels of transport: one at the outer tunnel layer typically according to TCP/TLS, and another at the inner tunnel layer typically according to UDP. FIG. 3 illustrates example protocol layers in a TSCF tunneling configuration 300 for encapsulating media traffic according to an embodiment. In TSCF tunneling configuration 300, compressed media (e.g., speech, video, etc.) is communicated according to RTP at the application layer, and is transported via an inner UDP at the inner transport layer within an inner IP at the inner network layer. The inner layers are within an outer TCP/TLS at the outer transport layer which is in turn within an outer IP at the outer network layer. In one embodiment, since most IP networks block any outer traffic that is not stream-based, TCP/TLS is used at the outer transport layer of TSCF tunnel 108 to guarantee delivery.

Voice calls using a client device such as UE 102 and TSCF, as opposed to non-tunneled calls, are desirable because every session is secure with all signaling and media being encapsulated in encrypted TSCF tunnel 108. For example, Voice over Internet Protocol ("VoIP") over wireless and Wi-Fi using TSCF is not suppressed or terminated by firewalls. Further, TSCF allows for easy diagnosis of signaling and media issues as the VoIP encapsulated packets are unencrypted within the tunnel. VoIP calls can switch without dropping when going from Wi-Fi to 4G/3G data and back again.

Further, with TSCF, strict firewall traversal becomes feasible because voice and video appear as a secure HTTPS session on port 443 to firewalls. Therefore, when a user wishes to place a call and a firewall is in the way, the mobile VoIP application (e.g., application 104 of FIG. 1) will establish a tunnel through any firewall in its path and connect directly to a TSCF-enabled VoIP server or session border controller.

To the VoIP server on the other side of the TSCF, the client appears as local IP address inside the tunnel. This simplifies SIP signaling, architectures, diagnosis, and troubleshooting as well. If network connectivity fails with the tunnel established, the tunnel is re-established quickly on a secondary network (e.g., Wi-Fi to 4G). Regardless of network, the IP address of the VoIP application stays the same to the SIP server. If audio is flowing, the call can resume as fast as the tunnel is re-established and there is no need to re-register the SIP endpoint or VoIP app.

Many client applications, such as application 104 of FIG. 1, create on-the-fly tunnels that are used to place encapsulated outgoing calls (i.e., voice and/or video calls) on an on-demand basis only. When these calls are placed back-to-back, an unnecessary peak of server 116 resource consumption due to tunnel termination and renegotiation occurs. In contrast, embodiments, transparent to the end user, delay any tunnel termination. Embodiments then verify whether, if a tunnel creation occurs right after a termination request, both termination and creation of a new tunnel can be avoided.

In one embodiment, in order to support the client tunnel persistence functionality, a new tunnel parameter is added to the configuration structures utilized by the "tsc_ctrl_new_tunnel" API in order to allow application 104 to enable client side tunnel persistence. In one embodiment, a tunnel affected by this persistence functionality does not issue a configuration release CM when terminated. Instead, it remains or "waits" in a latent state for a preconfigured period of time. Further, in one embodiment, while the tunnel is in a latent state, it is considered terminated by application 104. Specifically, from the point of view of application 104, there is no behavioral difference with respect to a normally terminated tunnel.

In one embodiment, while a tunnel is in latent state, all traffic received by tunneling client 106 and destined to the tunnel is dropped. When application 104 issues a new tunnel request while a tunnel is still latent, the latent tunnel wakes up and becomes active, taking over the a new tunnel handle, including the TSID. Since the tunnel already exists, there is no need for new transport, security and tunnel negotiation.

In one embodiment, once a preconfigured persistence period of time expires after a termination request, the latent tunnel is terminated through the regular configuration release mechanisms of TSCF.

Figure 4:
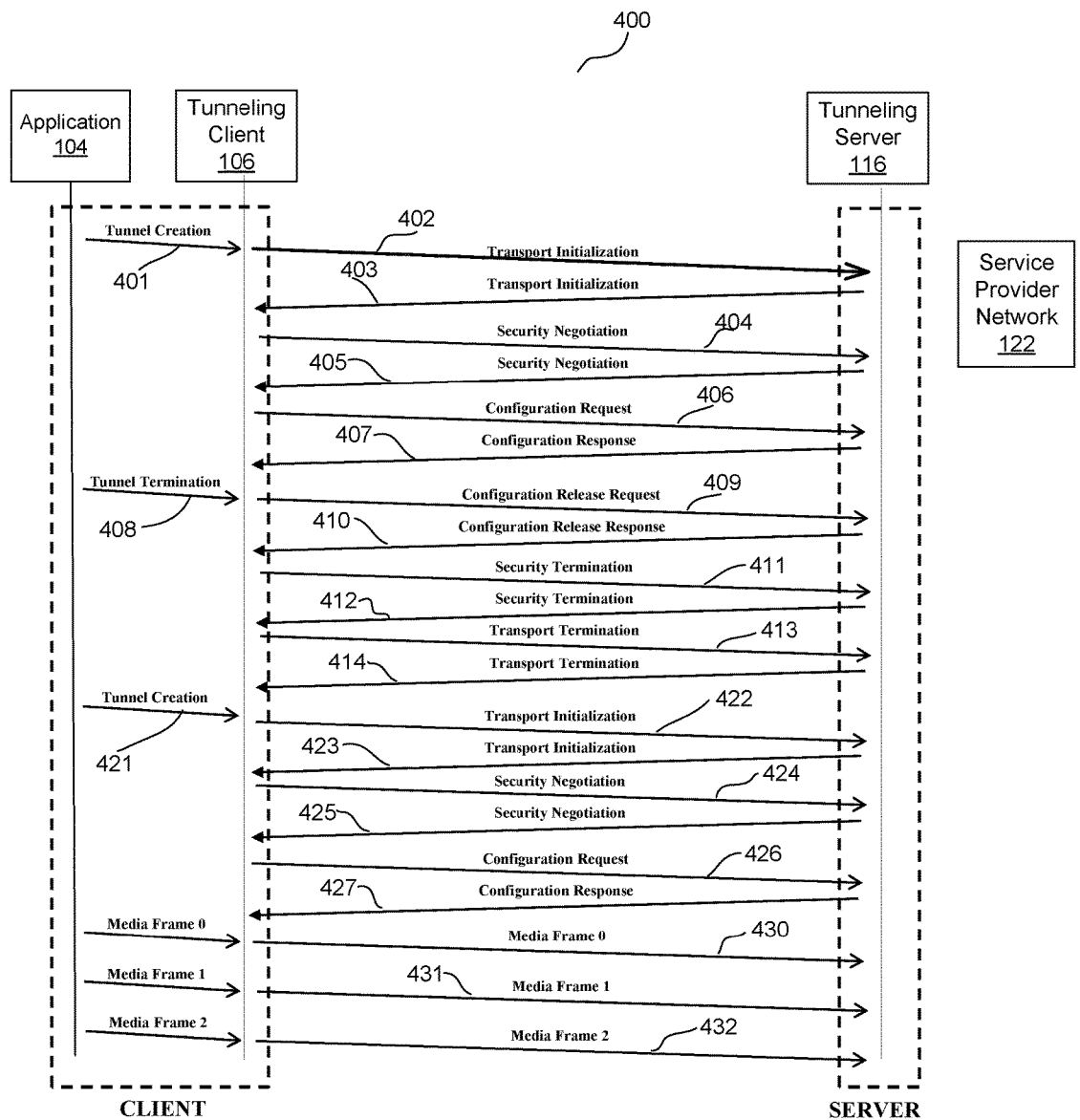
FIG. 4 is an example prior art message sequence diagram when embodiments of the inventions are not implemented by the tunneling client.

FIG. 4 is an example prior art message sequence diagram 400, including the sequence of messages exchanged between application 104, tunneling client 106 and tunneling server 116 of FIG. 1, when embodiments of the inventions are not implemented by tunneling client 106. In the example of FIG. 4, the tunnel created on-demand in response to a call initiation is automatically terminated when the call has ended. One advantage of this approach is that if client 106 (or UE 102) is a mobile device, battery life is preserved by terminating the tunnel at the conclusion of every call.

Under this flow, a tunnel 108 is created by application 104 at 401, typically by calling the "tsc_ctrl_new_tunnel" API, that triggers tunneling client 106 to internally negotiate a new set of transport and security parameters such as encryption and authentication. The tunnel itself is negotiated through tunnel configuration request and response TSCF CMs 402-407 exchanged between client 106 and server 116. When the application terminates the tunnel at 408, this causes client 106 to issue a tunnel configuration release CM at 409 that is responded back by server 116 by sending a tunnel configuration release response CM at 410 and terminating its transport and security at 411-414.

When the application starts a new tunnel at 421, which can happen in close proximity to tunnel termination command 408, the previously described tunnel creation steps are performed again at 422-427, and all media frames to be sent from application 104 are transmitted inside the new tunnel at 430-432.

Figure 5:
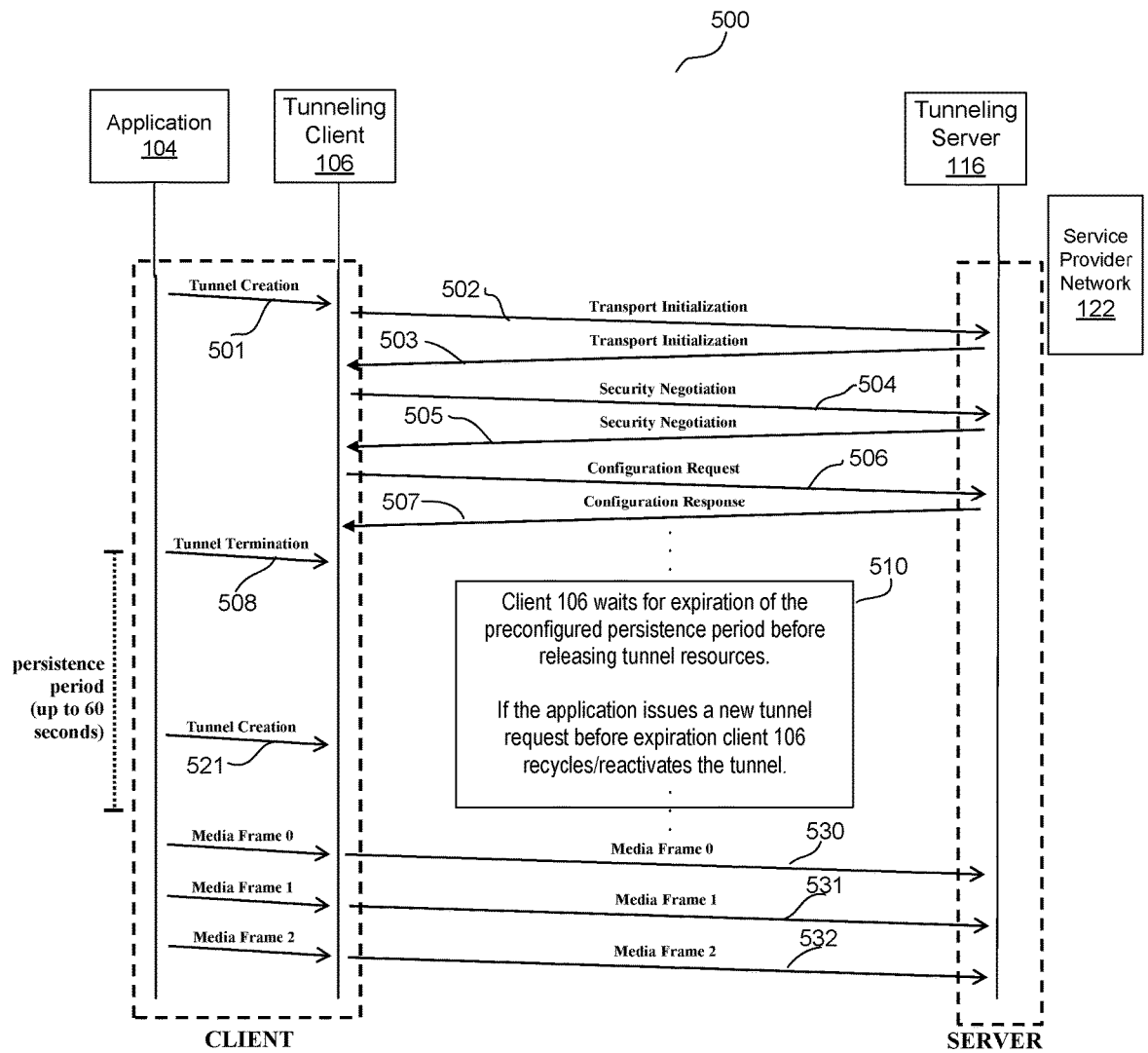
FIG. 5 is an example message sequence diagram for client tunnel persistence according to embodiments of the invention.

FIG. 5 is an example message sequence diagram 500, including the sequence of messages exchanged between application 104, tunneling client 106 and tunneling server 116 of FIG. 1, for client tunnel persistence according to embodiments of the invention. FIG. 5 includes network elements such as tunneling client 106 in communication with application 104, and tunneling server 116 in communication with service provider network 122, as described herein with reference to FIG. 1.

With the flow shown in FIG. 5, and with FIG. 4, a tunnel 108 is created by application 104 at 501, typically by calling the "tsc_ctrl_new_tunnel" API, that triggers tunneling client 106 to internally negotiate a new set of transport and security parameters such as encryption and authentication. The tunnel 108 itself is negotiated through tunnel configuration request and response TSCF CMs 502-507 exchanged between client 106 and server 116.

When application 104 terminates tunnel 108 at 508, at 510 client 106 does not terminate/remove tunnel 108 (as would be done in the prior art) and ignores any subsequent incoming traffic coming from server 116. Tunnel 108 is kept latent/waits for a preconfigured persistence period, which in one embodiment is up to 60 seconds. When application 104 creates a new tunnel at 521, it is automatically assigned to the previous set of transport and security parameters. These transport and security parameters are then used from that point on to transmit media frames at 530-532.

In comparison to known tunnel creation and termination procedures, such as shown in FIG. 4, embodiments decrease transmission rate and improve memory and computational resource consumption. Further, embodiments reduce the time required to make a new tunnel available because its handle is already available when the application requests it.

Specifically, embodiments improve performance not only by reducing computational complexity and memory consumption at server 116, but also by reducing the transmission rate and the call setup latency. For example, for 100 1-minute G.711 speech calls, where the calls are consecutively made within the predefined persistence period between calls (e.g., less than 60 seconds between calls) the average rate and latency improvement using embodiments of the invention is shown in Table 1 below:

TABLE 1

|  | WITHOUT PERSISTENCE | WITH PERSISTENCE USING EMBODIMENTS OF THE INVENTION | REDUCTION |
|---|---|---|---|
| CALL LATENCY (ms) | 4990 | 2 | 99.96% |
| TRANSMISSION RATE (bits per second) | 65533 | 64267 | 1.93% |

In one embodiment, to provide the efficient media traffic transport functionality, the "tsc_tunnel_params" structure of the TSCF SDK is upgraded to include a timer parameter "latency" that specifies the "persistence period" which indicates how many seconds a tunnel is to persist after terminated, as indicated by the following pseudo-code:

```
typedef struct
{
    tsc_connection_params
    connection_params[TSC_MAX_CONNECTION_PARAMS];
    .
    .
    .
    uint32_t max_connections;
    .
    .
    .
    time_t latency;
} tsc_tunnel_params;
```

The tsc_tunnel_params structure is passed as a parameter to the tsc_ctrl_new_tunnel API upon tunnel creation, as indicated by the following pseudo-code:
tsc_handle                                    tsc_new_tunnel
    (tsc_tunnel_params*tunnel_params,
    tsc_requested_config*requested_config)

where "tsc_handle" is the return type and "requested_config" provides an optional and additional set of configuration parameters. The default value of the "latency" parameter when the "tsc_tunnel_params" structure is first initialized is 0, forcing terminated tunnels not to persist. Similarly, the maximum value of this parameter is 60 in one embodiment, allowing tunnels to persist for up to one minute after termination.

Figure 6:
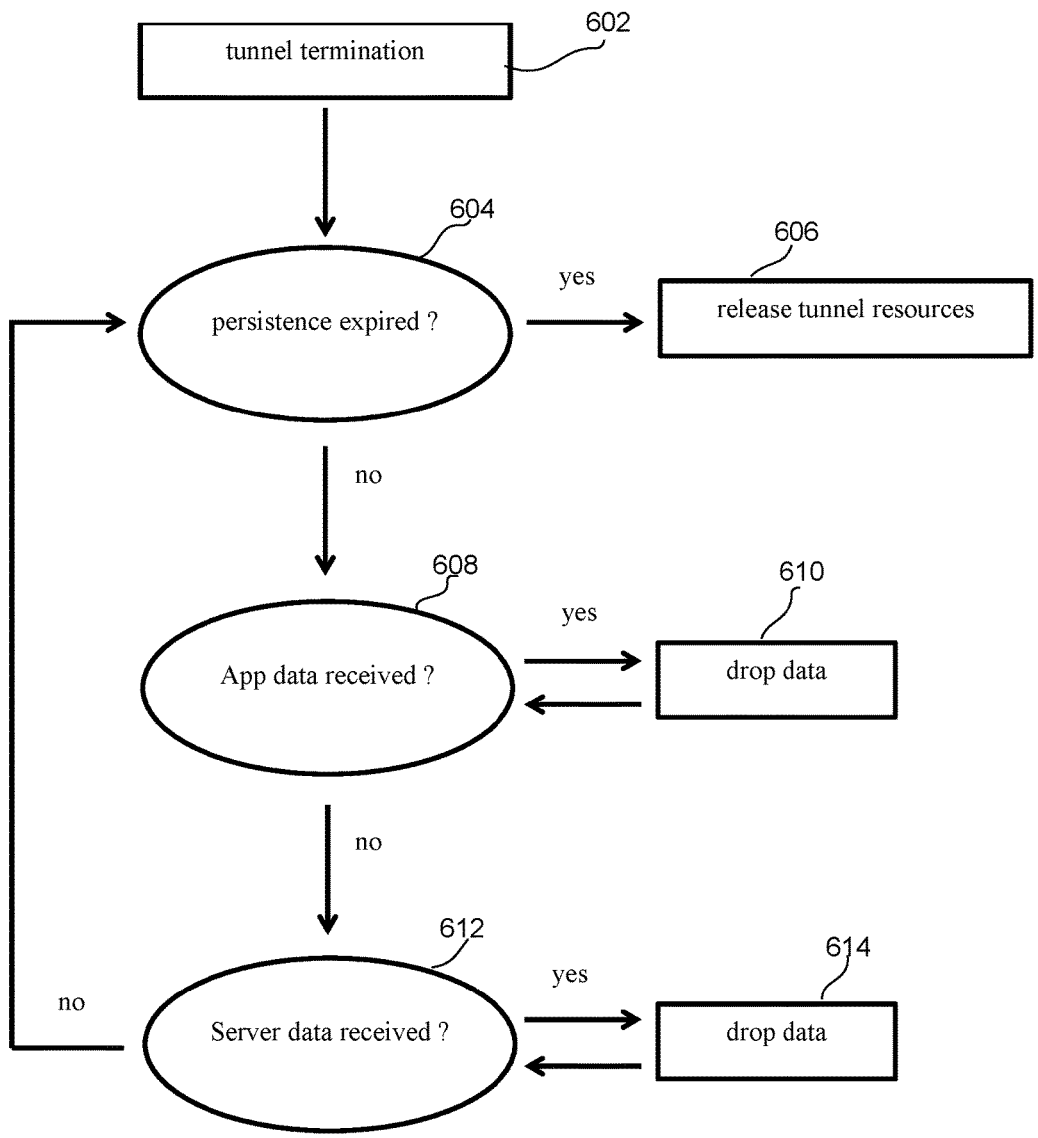
FIG. 6 is a flow diagram of the client tunnel persistence module of FIG. 2 and/or the tunneling client of FIG. 1 when performing client tunnel persistence in accordance with embodiments of the present invention.

FIG. 6 is a flow diagram of client tunnel persistence module 16 of FIG. 2 and/or tunneling client 106 of FIG. 1 when performing client tunnel persistence in accordance with embodiments of the present invention. In one embodiment, the functionality of the flow diagram of FIG. 6 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. In one embodiment, client 106 implements the functionality of FIG. 6 as a state machine.

The functionality of FIG. 6 occurs after a call is initiated by application 104. The call may be a voice call or a video call. Application 104 may initiate the call, for example, in response to a user dialing a telephone number at UE 102.

At 602, a tunnel termination request from application 104 is received (e.g., tunnel termination 508 of FIG. 5).

At 604, it is determined if the persistence period has expired. In one embodiment, the persistence period is 60 seconds from the time the tunnel termination request is received. If yes at 604, at 606 tunnel resources are released.

If no at 604, at 608 it is determined if data is received from application 104, and if yes at 608 then at 610 the data is dropped.

If no at 608, at 612 it is determined if data is received from server 116, and if yes at 612 then at 614 the data is dropped.

If no at 612, functionality continues at 604.

As disclosed, embodiments maintain a persistent tunnel between TSCF tunnel calls initiated by a client to a server that occur in close proximity to each other, instead of terminating the tunnel between calls. As a result, resource needs of the server are reduced and calls can be completed consecutively with minimal latency.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of initiating a plurality of calls using encapsulated media, the method comprising:
  in response to a first tunnel creation request, from an application associated with a first call, initiating the first call at a client by creating a first tunnel between the client and a server, wherein the first tunnel is established according to a tunneled services control function (TSCF) standard;
  transmitting the encapsulated media associated with the first call over the first tunnel, wherein the encapsulated media comprises voice data and/or video data associated with the first call;
  receiving from the application a request to terminate the first tunnel in response to a termination of the first call, the request comprising a TSCF configuration release request message;

in response to the request, waiting for an expiration of a predefined persistence period instead of terminating the first tunnel;

in response to a second tunnel creation request, from the application associated with a second call, before the expiration of the predefined persistence period, initiating the second call at the client using the first tunnel; and transmitting the encapsulated media associated with the second call over the first tunnel, wherein the encapsulated media comprises voice data and/or video data associated with the second call.

2. The method of claim 1, further comprising:
in response to the expiration of the predefined persistence period, terminating the first tunnel.

3. The method of claim 2, further comprising:
in response to a third tunnel creation request, from the application associated with a third call, after the expiration of the predefined persistence period, initiating the third call at the client by creating a second tunnel between the client and the server; and transmitting the encapsulated media associated with the third call over the second tunnel.

4. The method of claim 1, wherein the transmitting the encapsulated media comprises traversing a firewall.

5. The method of claim 1, further comprising:
in response to the tunnel termination request, before the expiration of the predefined persistence period, dropping all data received from the application.

6. The method of claim 1, further comprising:
in response to the tunnel termination request, before the expiration of the predefined persistence period, dropping all data received from the server.

7. The method of claim 1, wherein the plurality of calls are initiated from a mobile telephone, and the plurality of calls comprise voice calls.

8. A non-transitory computer readable medium having instructions stored thereon that, when executed by a processor, cause the processor to initiate a plurality of calls using encapsulated media, comprising:
in response to a first tunnel creation request, from an application associated with a first call, initiating the first call at a client by creating a first tunnel between the client and a server, wherein the first tunnel is established according to a tunneled services control function (TSCF) standard;

transmitting the encapsulated media associated with the first call over the first tunnel, wherein the encapsulated media comprises voice data and/or video data associated with the first call;

receiving from the application a request to terminate the first tunnel in response to a termination of the first call, the request comprising a TSCF configuration release request message;

in response to the request, waiting for an expiration of a predefined persistence period instead of terminating the first tunnel;

in response to a second tunnel creation request, from the application associated with a second call, before the expiration of the predefined persistence period, initiating the second call at the client using the first tunnel; and transmitting the encapsulated media associated with the second call over the first tunnel, wherein the encapsulated media comprises voice data and/or video data associated with the second call.

9. The computer readable medium of claim 8, further comprising:
in response to the expiration of the predefined persistence period, terminating the first tunnel.

10. The computer readable medium of claim 9, further comprising:
in response to a third tunnel creation request, from the application associated with a third call, after the expiration of the predefined persistence period, initiating the third call at the client by creating a second tunnel between the client and the server; and transmitting the encapsulated media associated with the third call over the second tunnel.

11. The computer readable medium of claim 8, wherein transmitting the encapsulated media comprises traversing a firewall.

12. The computer readable medium of claim 8, further comprising:
in response to the tunnel termination request, before the expiration of the predefined persistence period, dropping all data received from the application.

13. The computer readable medium of claim 8, further comprising:
in response to the tunnel termination request, before the expiration of the predefined persistence period, dropping all data received from the server.

14. The computer readable medium of claim 8, wherein the plurality of calls are initiated from a mobile telephone, and the plurality of calls comprise voice calls.

15. A user equipment device comprising:
an application; and
a tunneling client;
the tunneling client configured to:
in response to a first tunnel creation request, from the application associated with a first call, initiate the first call by creating a first tunnel between the tunneling client and a server, wherein the first tunnel is established according to a tunneled services control function (TSCF) standard;

transmit encapsulated media associated with the first call over the first tunnel, wherein the encapsulated media comprises voice data and/or video data associated with the first call;

receive from the application a request to terminate the first tunnel in response to a termination of the first call, the request comprising a TSCF configuration release request message;

in response to the request, wait for an expiration of a predefined persistence period instead of terminating the first tunnel;

in response to a second tunnel creation request, from the application associated with a second call, before the expiration of the predefined persistence period, initiate the second call using the first tunnel; and transmit the encapsulated media associated with the second call over the first tunnel, wherein the encapsulated media comprises voice data and/or video data associated with the second call.

16. The user equipment device of claim 15, the tunneling client further configured to, in response to the expiration of the predefined persistence period, terminate the first tunnel.

17. The user equipment device of claim 16, the tunneling client further configured to, in response to a third tunnel creation request, from the application associated with a third call, after the expiration of the predefined persistence period, initiate the third call by creating a second tunnel between the tunneling client and the server; and transmit the encapsulated media associated with the third call over the second tunnel.

18. The user equipment device of claim 15, wherein the transmitting the encapsulated media comprises traversing a firewall.

19. The user equipment device of claim 15, the tunneling client further configured to, in response to the tunnel termination request, before the expiration of the predefined persistence period, drop all data received from the application.

20. The user equipment device of claim 15, the tunneling client further configured to, in response to the tunnel termination request, before the expiration of the predefined persistence period, drop all data received from the server.

\* \* \* \* \*